(12) United States Patent
Shen et al.

(10) Patent No.: US 7,732,516 B2
(45) Date of Patent: Jun. 8, 2010

(54) FLAME RETARDANT POLYIMIDE/POLYESTER-POLYCARBONATE COMPOSITIONS, METHODS OF MANUFACTURE, AND ARTICLES FORMED THEREFROM

(75) Inventors: Gary Shen, Shanghai (CN); Lily Pan, Shanghai (CN)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/023,497

(22) Filed: Jan. 31, 2008

(65) Prior Publication Data

US 2009/0197999 A1    Aug. 6, 2009

(51) Int. Cl.
C08K 5/42    (2006.01)

(52) U.S. Cl. .......................... 524/162; 524/155; 524/161

(58) Field of Classification Search ................. 524/155, 524/161, 162
See application file for complete search history.

(56) References Cited

U.S. PATENT DOCUMENTS

| | | | |
|---|---|---|---|
| 3,971,756 A | 7/1976 | Bialous et al. | |
| 3,972,902 A | 8/1976 | Heath et al. | |
| 4,028,297 A | 6/1977 | Webb | |
| 4,110,299 A | 8/1978 | Mark | |
| 4,130,530 A | 12/1978 | Mark et al. | |
| 4,174,359 A | 11/1979 | Sivaramakrishnan et al. | |
| 4,303,575 A | 12/1981 | Reinert | |
| 4,335,038 A | 6/1982 | Thomas | |
| 4,404,350 A | 9/1983 | Ryang | |
| 4,455,410 A | 6/1984 | Giles, Jr. | |
| 4,552,911 A | 11/1985 | Cohnen et al. | |
| 4,690,997 A | 9/1987 | Cella et al. | |
| 4,808,686 A | 2/1989 | Cella et al. | |
| 4,816,527 A * | 3/1989 | Rock .......................... | 525/431 |
| 4,916,194 A | 4/1990 | Policastro et al. | |
| 4,918,125 A | 4/1990 | Boutni | |
| 5,051,438 A | 9/1991 | Djuric et al. | |
| 5,218,027 A | 6/1993 | Smith et al. | |
| 5,387,639 A | 2/1995 | Sybert et al. | |
| 5,508,323 A | 4/1996 | Romenesko et al. | |
| 5,521,258 A | 5/1996 | Cooper et al. | |
| 5,660,932 A * | 8/1997 | Durston ...................... | 428/373 |
| 5,852,085 A | 12/1998 | Brown et al. | |
| 5,986,016 A * | 11/1999 | Puyenbroek et al. ........ | 525/420 |
| 6,116,467 A | 9/2000 | Petriekis et al. | |
| 6,610,794 B1 | 8/2003 | Sakurai et al. | |
| 6,790,899 B2 * | 9/2004 | Singh et al. ................. | 524/460 |
| 2004/0116588 A1 * | 6/2004 | Lin et al. ..................... | 524/494 |
| 2005/0038145 A1 | 2/2005 | Gallucci et al. | |
| 2005/0131105 A1 | 6/2005 | Choate et al. | |
| 2005/0288406 A1 * | 12/2005 | Gallucci et al. ............. | 524/115 |
| 2006/0084748 A1 | 4/2006 | Gallucci et al. | |
| 2007/0066737 A1 * | 3/2007 | Gallucci et al. ............. | 524/430 |
| 2007/0191518 A1 * | 8/2007 | Chen et al. .................. | 524/155 |
| 2007/0191519 A1 * | 8/2007 | Jiao et al. .................... | 524/156 |
| 2007/0197700 A1 | 8/2007 | Gallucci et al. | |

FOREIGN PATENT DOCUMENTS

| EP | 0158733 A1 | 10/1985 |
|---|---|---|
| EP | 0375942 A2 | 7/1990 |
| EP | 0519657 A | 12/1992 |
| JP | 2001240743 A | 9/2001 |

OTHER PUBLICATIONS

UItem 1010.*
ASTM Designation: D 648-07, "Standard Test Method for Deflection Temperature of Plastics Under Flexural Load in the Edgewise Position," 13pp (2007).
ASTM Designation: D 1238-04c, "Standard Test Method for Melt Flow Rates of Thermoplastics by Extrusion Plastometer," 14 pp (2004).
ASTM Designation: D 3835-02, "Standard Test Method for Determination of Properties of Polymeric Materials by Means of a Capillary Rheometer," 11 pp (2002).
ASTM Designation: D 5205-96 (Reapproved 2003), "Stanard Classification System for Polyetherimide (PEI) Materials," 7 pp. (2003).
UL 94, "Tests for Flammability of Plastic Materials for Parts in Devices and Appliances," (2003).
International Search Report; International Application No. PCT/IB2009/050255; International Filing Date: Jan. 22, 2009; Date of Mailing : Apr. 8, 2009; 4 pages.
Written Opinion of the International Searching Authority; International Application No. PCT/IB/2009/050255; International Filing Date: Jan. 20, 2009; Date of Mailing: Apr. 8, 2009; 5 pages.

* cited by examiner

*Primary Examiner*—Milton I Cano
*Assistant Examiner*—John Uselding
(74) *Attorney, Agent, or Firm*—Cantor Colburn LLP

(57) ABSTRACT

A composition is disclosed, comprising, based on the total weight of the composition, from 20 to 60 wt. % of a polyimide having a glass transition temperature above 180° C.; from 10 to 30 wt. % a polyester-polycarbonate copolymer; from 30 to 60 wt. % of a reinforcing filler; and at least two flame retardant additives selected from the group consisting of from 0.01 to 0.5 wt. % of a first sulfonate salt, from 0.01 to 0.5 wt. % of a second sulfonate salt, from 0.5 to 5 wt. % of a siloxane copolymer, and combinations thereof. An article molded from the composition attains an improved UL94 rating, as compared to an article molded from the same composition without the at least two flame retardant additives.

14 Claims, No Drawings

US 7,732,516 B2

FLAME RETARDANT POLYIMIDE/POLYESTER-POLYCARBONATE COMPOSITIONS, METHODS OF MANUFACTURE, AND ARTICLES FORMED THEREFROM

BACKGROUND OF THE INVENTION

This disclosure relates to polyimide compositions, and in particular flame retardant polyetherimide/polyester-polycarbonate compositions, as well as their method of manufacture and articles formed from the polyimide compositions.

Polyimides (PI), and in particular polyetherimides (PEI), are amorphous, transparent high performance polymers having a glass transition temperature (Tg) of greater than 180° C. These polymers further have high strength, heat resistance, and modulus, and broad chemical resistance. Polyetherimides are widely used in application as diverse as automotive, telecommunication, aerospace, electrical/electronics, transportation, and healthcare. Filled and unfilled PEI compositions further comprising a polycarbonate (PC) and/or polyester-polycarbonate (PCE) are particularly useful as molded parts for metal replacement, for example in automotive and electrical/electronic applications. PEI-PCE blends have good mechanical and thermal properties, including excellent dimensional stability at high temperatures.

There has long been interest in developing thermoplastic compositions, in particular PEI-PCE compositions that are flame retardant. A specific area of interest in compositions for transportation applications, such as rail cars and airplanes. Polymer blends that have been used in these applications are described, for example, in U.S. Pat. No. 5,051,483. These compositions combine PEI with PCE and polyetherimide siloxane copolymers. Despite the effectiveness of these compositions there still exists a need for even better flame resistance performance in these polymer compositions. It would be advantageous if improved flame retardance could be achieved without significantly adversely affecting the good mechanical and thermal properties of the compositions. It would further be advantageous if flame retardance could be achieved in the absence of halogenated flame retardants, in particular brominated and/or chlorinated flame retardants.

SUMMARY OF THE INVENTION

Disclosed herein is a composition comprising, based on the total weight of the composition, from 20 to 60 wt. % of a polyimide having a glass transition temperature above 180° C.; from 10 to 30 wt. % a polyester-polycarbonate, wherein the content of ester units is from greater than 0 to 60 wt. % of the polyester-polycarbonate; from 30 to 60 wt. % of a reinforcing filler; at least two flame retardant additives selected from the group consisting of from 0.01 wt. % to 0.5 wt. % of a first sulfonate salt, from 0.01 wt. % to 0.5 wt. % of a second sulfonate salt, from 0.5 wt. % to 5 wt. % of a siloxane copolymer, and combinations thereof, wherein an article molded from the composition attains an improved UL94 rating, as compared to an article molded from the same composition without the at least two flame retardant additives.

In another embodiment, a method of manufacture of the above compositions comprises melt blending the components of the aforementioned composition.

Articles comprising the above compositions are also disclosed.

A method of forming an article comprises shaping, extruding, blow molding, or injection molding the above compositions to form the article.

DETAILED DESCRIPTION OF THE INVENTION

It has been found by the inventors hereof that a surprising improvement in the flame retardant performance of thermoplastic compositions comprising a polyimide and a polyester-polycarbonate can be obtained using a combination of non-halogenated and/or non-brominated flame retardants comprising a sulfonate group. Optionally, a siloxane copolymer, in particular a polyetherimide siloxane copolymer (PEI-siloxane) can be present. The inventive compositions can attain a UL94 rating of V2, V1, or even V0, even using thin samples. The compositions can also exhibit good mechanical properties, for example high flexural modulus and high tensile elongation at break. Melt flow of the compositions is also acceptable.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations. The endpoints of all ranges directed to the same component or property are inclusive of the endpoint and independently combinable.

All molecular weights in this application refer to weight average molecular weights unless indicated otherwise. All such mentioned molecular weights are expressed in Daltons.

The terms "a" and "an" do not denote a limitation of quantity, but rather denote the presence of at least one of the referenced item. As used herein, "combinations thereof" is inclusive of one or more of the recited elements, optionally together with a like element not recited. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and can or can not be present in other embodiments. In addition, it is to be understood that the described element(s) can be combined in any suitable manner in the various embodiments.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. The term "alkyl" includes both $C_{1-30}$ branched and straight chain, unsaturated aliphatic hydrocarbon groups having the specified number of carbon atoms. Examples of alkyl include, but are not limited to, methyl, ethyl, n-propyl, i-propyl, n-butyl, s-butyl, t-butyl, n-pentyl, s-pentyl, n- and s-hexyl, n- and s-heptyl, and, n- and s-octyl. The term "aryl" means an aromatic moiety containing the specified number of carbon atoms, such as to phenyl, tropone, indanyl, or naphthyl.

All ASTM tests are based on the 2003 edition of the Annual Book of ASTM Standards unless otherwise indicated.

The polyimides, including polyetherimides, used in the flame retardant thermoplastic compositions comprise structural units derived from a dianhydride and a diamine. Exemplary dianhydrides have the formula (1)

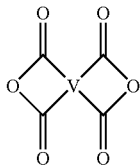
(1)

wherein V is a tetravalent linker selected from the group consisting of substituted or unsubstituted, saturated, unsaturated or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers. Suitable substitutions and/or linkers include, but are not limited to, carbocyclic groups, aryl groups, ethers, sulfones, sulfides amides, esters, and combinations comprising at least one of the foregoing. Exemplary linkers include, but are not limited to, tetravalent aromatic radicals of formula (2), such as:

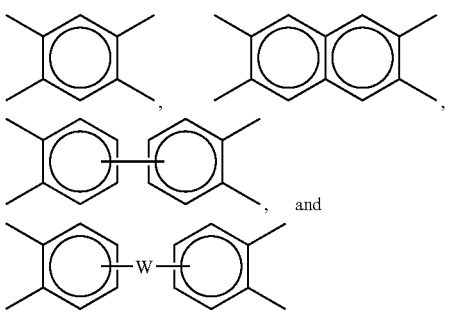
(2)

wherein W is a divalent moiety such as —O—, —S—, —C(O)—, —SO$_2$—, —SO—, —C$_y$H$_{2y}$— (y being an integer of 1 to 20), and halogenated derivatives thereof, including perfluoroalkylene groups, or a group of the formula —O—Z—O— wherein the divalent bonds of the —O— or the —O—Z—O— group are in the 3,3',3,4',4,3', or the 4,4' positions, and wherein Z includes, but is not limited to, divalent moieties of formula (3)

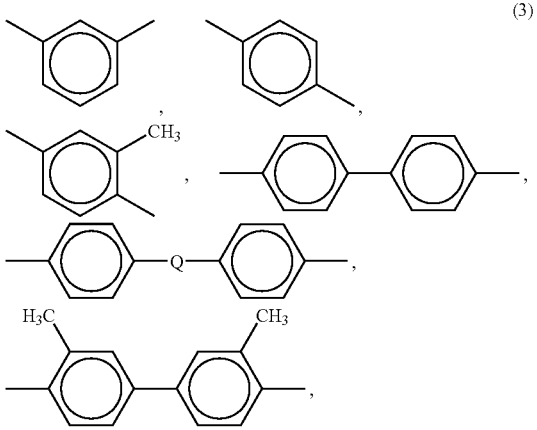
(3)

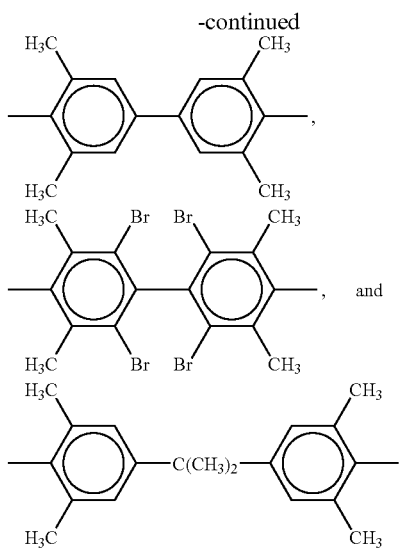

wherein Q includes, but is not limited to, a divalent moiety comprising —O—, —S—, —C(O)—, —SO$_2$—, —SO—, —C$_y$H$_{2y}$— (y being an integer from 1 to 20), and halogenated derivatives thereof, including perfluoroalkylene groups. In some embodiments the tetravalent linker V is free of halogens.

In one embodiment, the dianhydride comprises an aromatic bis(ether anhydride), which provides polyetherimides. Examples of specific aromatic bis(ether anhydride)s are disclosed, for example, in U.S. Pat. Nos. 3,972,902 and 4,455,410. Illustrative examples of aromatic bis(ether anhydride)s include:

2,2-bis[4-(3,4-dicarboxyphenoxy)phenyl]propane dianhydride(bisphenol-A dianhydride);

4,4'-bis(3,4-dicarboxyphenoxy)diphenyl ether dianhydride;

4,4'-bis(3,4-dicarboxyphenoxy)diphenyl sulfide dianhydride;

4,4'-bis(3,4-dicarboxyphenoxy)benzophenone dianhydride;

4,4'-bis(3,4-dicarboxyphenoxy)diphenyl sulfone dianhydride;

2,2-bis[4-(2,3-dicarboxyphenoxy)phenyl]propane dianhydride;

4,4'-bis(2,3-dicarboxyphenoxy)diphenyl ether dianhydride;

4,4'-bis(2,3-dicarboxyphenoxy)diphenyl sulfide dianhydride;

4,4'-bis(2,3-dicarboxyphenoxy)benzophenone dianhydride;

4,4'-bis(2,3-dicarboxyphenoxy)diphenyl sulfone dianhydride;

4-(2,3-dicarboxyphenoxy)-4'-(3,4-dicarboxyphenoxy) diphenyl-2,2-propane dianhydride;

4-(2,3-dicarboxyphenoxy)-4'-(3,4-dicarboxyphenoxy) diphenyl ether dianhydride;

4-(2,3-dicarboxyphenoxy)-4'-(3,4-dicarboxyphenoxy) diphenyl sulfide dianhydride;

4-(2,3-dicarboxyphenoxy)-4'-(3,4-dicarboxyphenoxy) benzophenone dianhydride; and 4-(2,3-dicarboxyphenoxy)-4'-(3,4-dicarboxyphenoxy) diphenyl sulfone dianhydride, as well as mixtures comprising at least two of the foregoing.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

A chemical equivalent to a dianhydride can also be used. Examples of dianhydride chemical equivalents include tetrafunctional carboxylic acids capable of forming a dianhydride and ester or partial ester derivatives of the tetra functional carboxylic acids. Mixed anhydride acids or anhydride esters can also be used as an equivalent to the dianhydride. As used throughout the specification and claims "dianhydride" will refer to dianhydrides and their chemical equivalents.

In some embodiments the dianhydride is selected from the groups consisting of bisphenol-A dianhydride, oxydiphthalic anhydride (ODPA) and combinations thereof. Oxydiphthalic anhydride has the general formula (4):

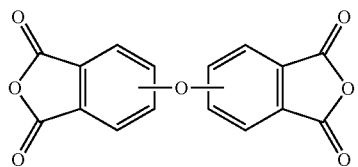
(4)

and derivatives thereof as further defined below.

The oxydiphthalic anhydrides of formula (4) include 4,4'-oxybisphthalic anhydride, 3,4'-oxybisphthalic anhydride, 3,3'-oxybisphthalic anhydride, and any mixtures thereof. For example, the oxydiphthalic anhydride of formula (IV) can be 4,4'-oxybisphthalic anhydride having the following formula (5):

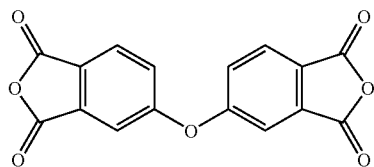
(5)

The term oxydiphthalic anhydrides includes derivatives of oxydiphthalic anhydrides which can also be used to make polyetherimides. Examples of oxydiphthalic anhydride derivatives which can function as a chemical equivalent for the oxydiphthalic anhydride in polyetherimide-forming reactions include oxydiphthalic anhydride derivatives of the formula (6):

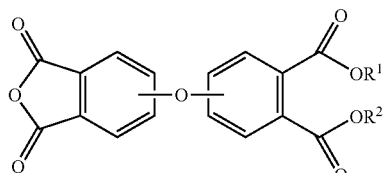
(6)

wherein $R^1$ and $R^2$ of formula VIII can be, independently at each occurrence, any of the following: hydrogen; a $C_1$-$C_8$ alkyl group; an aryl group. $R^1$ and $R^2$ can be the same or different to produce an oxydiphthalic anhydride acid, an oxydiphthalic anhydride ester, and an oxydiphthalic anhydride acid ester.

Derivatives of oxydiphthalic anhydrides can also be of the following formula (7):

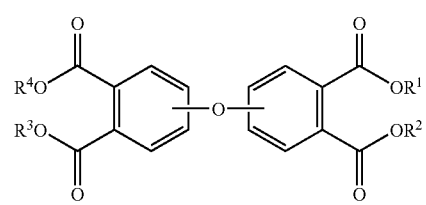
(7)

wherein $R^1$, $R^2$, $R^3$, and $R^4$ of formula (7) can be, independently at each occurrence, any of the following: hydrogen, a $C_1$-$C_8$ alkyl group, or an aryl group. $R^1$, $R^2$, $R^3$, and $R^4$ can be the same or different to produce an oxydiphthalic acid, an oxydiphthalic ester, and an oxydiphthalic acid ester.

Useful diamines have the formula (8):

$$H_2N-R^{10}-NH_2 \qquad (8)$$

wherein $R^{10}$ is a substituted or unsubstituted divalent organic moiety such as: an aromatic hydrocarbon moiety having 6 to 20 carbons and halogenated derivatives thereof; a straight or branched chain alkylene moiety having 2 to 20 carbons; a cycloalkylene moiety having 3 to 20 carbon atoms; or a divalent moiety of the general formula (9)

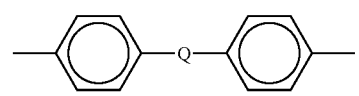
(9)

wherein Q is a divalent moiety selected from the group consisting of —O—, —S—, —C(O)—, —SO$_2$—, —SO—, and —C$_y$H$_{2y}$— wherein y is an integer from 1 to 20. Examples of specific organic diamines are disclosed, for example, in U.S. Pat. Nos. 3,972,902 and 4,455,410. Exemplary diamines include ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(p-amino-t-butyl)toluene, bis(p-amino-t-butylphenyl)ether, bis(p-methyl-o-aminophenyl)benzene, bis(p-methyl-o-aminopentyl)benzene, 1,3- diamino-4-isopropylbenzene, bis(4-aminophenyl)sulfide, bis (4-aminophenyl)sulfone, bis(4-aminophenyl)ether and 1,3-bis(3-aminopropyl)tetramethyldisiloxane. Mixtures of these compounds can also be used. In one embodiment the diamine is an aromatic diamine, or, more specifically, m-phenylene-diamine, p-phenylenediamine, sulfonyl dianiline, and mixtures thereof.

In some embodiments the diamine is selected from the group consisting of m-phenylenediamine, p-phenylenediamine, diamino diaryl sulfones and combinations thereof. Diamino diaryl sulfones (DAS) have the general formula (10):

$$H_2N-Ar^1-SO_2-Ar^2-NH_2 \quad (10)$$

wherein $Ar^1$ and $Ar^2$ independently are an aryl group containing a single or multiple rings. Several aryl rings can be linked together, for example through ether linkages, sulfone linkages or more than one sulfone linkages. The aryl rings can also be fused. In one embodiment $Ar^1$ and $Ar^2$ independently comprise 5 to 12 carbons, specifically 6 to 12 carbons. In one embodiment $Ar^1$ and $Ar^2$ are both phenyl groups.

In some embodiments the polyimide is a polyetherimide derived from a bis(ether anhydride) and a diamine, wherein the bis(ether anhydride) is bisphenol-A dianhydride (BPADA), oxydiphthalic anhydride (ODPA), or a combination thereof;

and wherein the diamine is m-phenylenediamine, p-phenylenediamine, a diamino diaryl sulfone (DAS), or a combination thereof.

The polyimides (including polyetherimides and polyetherimide sulfones as described above) can be made using methods known in the art. In one embodiment, a method using a highly polar solvent that dissolves both the reactant monomers and the resultant polymers is used. Solvents such as dimethyl formamide (DMF), dimethyl acetamide (DMAC), N-methyl pyrrolidinone (NMP), hexamethyl phosphoramide (HMPA) and dimethyl sulfoxide (DMSO) can be used in this method. The resultant polymers are completely dissolved and can be isolated from solution by removal of solvent as part of a film casting or other evaporative process or by precipitation using an anti-solvent such as methanol.

In another embodiment, a method as described in U.S. Pat. No. 4,835,249 can be used to make the polyimides. In this method, reactant monomers are dissolved in a solvent and then polymerized to an extent where the polymer precipitates from solution and can eventually be isolated by filtration or other related separation technique.

In yet another embodiment, polyimides can be made using a process comprising stirring a diamine and a dianhydride in a solvent to form a slurry, heating the slurry to a temperature sufficient for the diamine and dianhydride to react wherein the temperature is below the melting point of the dianhydride, below the melting point of the diamine, or below the melting points of the dianhydride and diamine, and reacting the diamine and dianhydride to form a polyimide having sufficient molecular weight to precipitate from the solvent.

A chain-terminating agent can be used to control the molecular weight of the final polymer product. The chain terminating agent can be partially or totally soluble in the starting reaction mixture. Mono-amines, mono-anhydrides such as phthalic anhydride, or combinations of mono-amines and mono-anhydrides can be used. The amount of mono-amine, mono-anhydride, or mixture thereof, can be any amount that provides the desired molecular weight of the polyimide. In some embodiments the amount of mono-amine, mono-anhydride, or combination thereof can be 0.1 to 15.0 mole %, or, more specifically, 0.1 to 5.0 mole %, based on the total monomer content.

Mono-amines that can be used to end cap the polyimide can have from 3 to 24 carbon atoms, can be aliphatic or aromatic, and can include, but are not limited to, substituted or unsubstituted anilines, substituted or unsubstituted naphthyl amines and substituted or unsubstituted heteroaryl amines. The mono-amines can have additional functionality, for instance, aryl groups, alkyl groups, aryl-alky groups, sulfone groups, ester groups, amide groups, halogens, alkyl or aryl halogen groups, alkyl ether groups, aryl ether groups, or aryl keto groups. Some particular substituents on mono-amines include, but are not limited to, halo and perfluoroalkyl. The attached functionality should not impede the function of the mono-amine in controlling polyimide molecular weight.

Mono-anhydrides can also have 3 to 24 carbon atoms, can be aliphatic or aromatic, and include, but are not limited to, substituted or unsubstituted phthalic anhydrides for instance, phthalic anhydride, chlorophthalic anhydride, methoxyphthalic anhydride, phenoxyphthalic anhydride, and naphthyl anhydrides. End capping agents can also be chosen from the group consisting of 1,2-dicarboxylic acids, 1,2-dicarboxylic esters, 1,2-dicarboxylic ester acids and mixtures comprising one or more of the foregoing.

The polyimides can have a weight average molecular weight (Mw) of 5,000 to 100,000 grams per mole (g/mole) as measured by gel permeation chromatography (GPC). In some embodiments the Mw can be 10,000 to 80,000. The molecular weights as used herein refer to the absolute weight averaged molecular weight (Mw). The polyimide can have an intrinsic viscosity greater than or equal to 0.2 deciliters per gram (dl/g) as measured in m-cresol at 25° C. Within this range the intrinsic viscosity can be 0.35 to 1.0 dl/g, as measured in m-cresol at 25° C.

The polyimides can have a glass transition temperature of greater than 180° C., specifically of 200° C. to 500° C., as measured using differential scanning calorimetry (DSC) per ASTM test D3418. In some embodiments the polyimide, an in particular a polyetherimide has a glass transition temperature of 240 to 350° C.

The polyimides can have a melt index of 0.1 to 10 grams per minute (g/min), as measured by American Society for Testing Materials (ASTM) DI 238 at 340 to 370° C., using a 6.6 kilogram (kg) weight. The polyimides typically have an intrinsic viscosity greater than 0.2 deciliters per gram (dl/g), or, more specifically, 0.35 to 0.7 dl/g as measured in m-cresol at 25° C. Examples of some polyetherimides useful in blends described herein are listed in ASTM D5205 "Standard Classification System for Polyetherimide (PEI) Materials."

The amount of polyimide used in the flame retardant thermoplastic composition can vary widely, and is that amount effective to provide the desired physical properties and flame resistance. In some instances the polyimide is present in an amount from 20 wt. % (weight percent) to 60 wt. %, specifically 25 to 60 wt. %, and more specifically 25 to 40 wt. %, each based on the total weight of the composition.

The thermoplastic composition further comprises a polyester-polycarbonate copolymer. The polyester-polycarbonate copolymer comprises, based on the total weight of the copolymer, from greater than 0 to 60 weight percent of arylate ester units and from 40 to less than 100 weight percent of carbonate units. The repeating structural carbonate units are of formula (13):

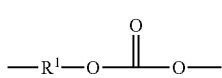

(13)

in which at least 60 percent of the total number of $R^1$ groups contain aromatic organic groups and the balance thereof are aliphatic, alicyclic, or aromatic groups. In an embodiment, each $R^1$ is a $C_{6-30}$ aromatic group, that is, contains at least one aromatic moiety. $R^1$ can be derived from a dihydroxy compound of the formula HO—$R^1$—OH, in particular a dihydroxy compound of formula (14):

$$HO—A^1—Y^1—A^2—OH \quad (14)$$

wherein each of $A^1$ and $A^2$ is a monocyclic divalent aromatic group and $Y^1$ is a single bond or a bridging group having one or more atoms that separate $A^1$ from $A^2$. In an exemplary embodiment, one atom separates $A^1$ from $A^2$. Specifically, each $R^1$ can be derived from a dihydroxy aromatic compound of formula (15)

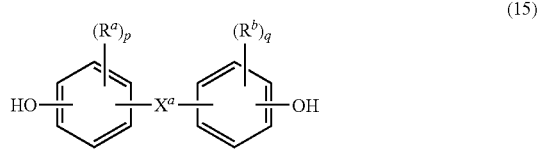

(15)

wherein $R^a$ and $R^b$ each represent a halogen or $C_{1-12}$ alkyl group and can be the same or different; and p and q are each independently integers of 0 to 4. Also in formula (6), $X^a$ represents a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic bridging group can be disposed such that the $C_6$ arylene groups connected thereto are each connected to a common alkylidene carbon or to different carbons of the $C_{1-18}$ organic bridging group. In one embodiment, p and q is each 1, and $R^a$ and $R^b$ are each a $C_{1-3}$ alkyl group, specifically methyl, disposed meta to the hydroxy group on each arylene group.

In an embodiment, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. More specifically, the dihydroxy compound of formula (15) is bisphenol-A.

Other useful aromatic dihydroxy compounds of the formula HO—$R^1$—OH include compounds of formula (16)

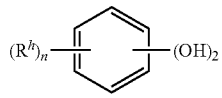

(16)

herein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis (4-hydroxyphenyl)methane, bis(4-hydroxyphenyl)diphenylmethane, bis(4-hydroxyphenyl)-1-naphthylmethane, 1,2-bis (4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis (hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantine, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2, 2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9, 10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds of formula (15) include 1,1-bis(4-hydroxyphenyl)methane, 1,1-bis(4-hydroxyphenyl)ethane, 2,2-bis(4-hydroxyphenyl)propane (hereinafter "bisphenol-A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds can also be used. In one specific embodiment, the polycarbonate is a linear homopolymer derived from bisphenol-A, in which each of $A^1$ and $A^2$ is p-phenylene, each of p and q is zero, and $Y^1$ is isopropylidene.

The arylate ester units are of formula (17)

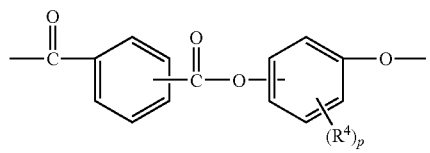

(17)

wherein each $R^4$ is independently a halogen or a $C_{1-4}$ alkyl, and p is 0 to 3. The arylate ester units can be derived from the reaction of a mixture of terephthalic acid and isophthalic acid or chemical equivalents thereof with compounds such as 5-methyl resorcinol, 5-ethyl resorcinol, 5-propyl resorcinol, 5-butyl resorcinol, 5-t-butyl resorcinol, 2,4,5-trifluoro resorcinol, 2,4,6-trifluoro resorcinol, 4,5,6-trifluoro resorcinol, 2,4,5-tribromo resorcinol, 2,4,6-tribromo resorcinol, 4,5,6-tribromo resorcinol, catechol, hydroquinone, 2-methyl hydroquinone, 2-ethyl hydroquinone, 2-propyl hydroquinone, 2-butyl hydroquinone, 2-t-butyl hydroquinone, 2,3,5-trimethyl hydroquinone, 2,3,5-tri-t-butyl hydroquinone, 2,3,5-trifluoro hydroquinone, 2,3,5-tribromo hydroquinone, or a combination comprising at least one of the foregoing compounds.

In a specific embodiment, the polyester-polycarbonate copolymer is a poly(isophthalate-terephthalate-resorcinol ester)-co-(bisphenol-A carbonate).

The polyester-polycarbonate copolymer comprises terminal groups derived from the reaction with a chain stopper (also referred to as a capping agent), which limits molecular weight growth rate, and so controls molecular weight in the polycarbonate. The chain stoppers are monophenolic compounds of formula (18)

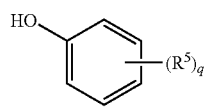

(18)

wherein each $R^5$ is independently halogen, $C_{1-22}$ alkyl, $C_{1-22}$ alkoxy, $C_{1-22}$ alkoxycarbonyl, $C_{6-10}$ aryl, $C_{6-10}$ aryloxy, $C_{6-10}$ aryloxycarbonyl, $C_{6-10}$ arylcarbonyl, $C_{7-22}$ alkylaryl, $C_{7-22}$ arylalkyl, $C_{6-30}$ 2-benzotriazole, or triazine, and q is 0 to 5. As used herein, $C_{6-16}$ benzotriazole includes unsubstituted and substituted benzotriazoles, wherein the benzotriazoles are substituted with up to three halogen, cyano, $C_{1-8}$ allyl, $C_{1-8}$ alkoxy, $C_{6-10}$ aryl, or $C_{6-10}$ aryloxy groups.

Suitable monophenolic chain stoppers of formula (18) include phenol, p-cumyl-phenol, p-tertiary-butyl phenol, hydroxy diphenyl, monoethers of hydroquinones such as p-methoxyphenol, alkyl-substituted phenols including those with branched chain alkyl substituents having 8 to 9 carbon atoms, monophenolic UV absorber such as 4-substituted-2-hydroxybenzophenone, aryl salicylate, monoesters of diphenols such as resorcinol monobenzoate, 2-(2-hydroxyaryl)-benzotriazole, 2-(2-hydroxyaryl)-1,3,5-triazines, and the like. Specific monophenolic chain stoppers include phenol, p-cumylphenol, and resorcinol monobenzoate.

It is also within the scope of the invention to use other types of chain stoppers, for example monocarboxylic acid halides, monohaloformates, and the like. Such chain stoppers can be of formula (18), wherein a —C(O)X or —OC(O)Cl group is present in place of the phenolic hydroxyl group, and X is a halogen, particularly bromine or chlorine. Monocarboxylic acid chlorides and monochloroformates are particularly useful. Exemplary monocarboxylic acid chlorides include monocyclic, monocarboxylic acid chlorides such as benzoyl chloride, $C_{1-22}$ alkyl-substituted benzoyl chloride, 4-methylbenzoyl chloride, halogen-substituted benzoyl chloride, bromobenzoyl chloride, cinnamoyl chloride, 4-nadimidobenzoyl chloride, and mixtures thereof; polycyclic, monocarboxylic acid chlorides such as trimellitic anhydride chloride, and naphthoyl chloride; and mixtures of monocyclic and polycyclic monocarboxylic acid chlorides. Chlorides of aliphatic monocarboxylic acids with up to 22 carbon atoms, and functionalized chlorides of aliphatic monocarboxylic acids, such as acryloyl chloride and methacryloyl chloride, are also contemplated. Monochloroformates include monocyclic monochloroformates, such as phenyl chloroformate, alkyl-substituted phenyl chloroformate, p-cumyl phenyl chloroformate, toluene chloroformate, and mixtures thereof. A combination of different chain stoppers can be used, for example a combination of two different monophenolic chain stoppers or a combination of a monophenolic chain stopper and a monochloroformate chain stopper.

The type and amount of chain stopper used in the manufacture of the polyester-polycarbonate copolymers are selected to provide copolymers having an Mw of 1,500 to 100,000 Daltons, specifically 1,700 to 50,000 Daltons, and more specifically 2,000 to 40,000 Daltons. Molecular weight determinations are performed using gel permeation chromatography, using a crosslinked styrene-divinylbenzene column and calibrated to bisphenol-A polycarbonate references. Samples are prepared at a concentration of 1 milligram per milliliter, and are eluted at a flow rate of 1.0 milliliter per minute.

The polyester-polycarbonates can be manufactured by processes such as interfacial polymerization and melt polymerization as are known in the art. The polyester-polycarbonates are generally of high molecular weight and have an intrinsic viscosity, as determined in chloroform at 25° C. of 0.3 to 1.5 dl/gm, and preferably from 0.45 to 1.0 dl/gm. These polyester-polycarbonates may be branched or unbranched and generally will have a weight average molecular weight of from 10,000 to 200,000, preferably from 20,000 to 100,000 as measured by gel permeation chromatography.

The amount of polyester-polycarbonate used in the flame retardant thermoplastic composition can vary widely, and is that amount effective to provide the desired physical properties and flame resistance. In some instances the polyester-polycarbonate is present in an amount from 10 to 30 wt. %, specifically 15 to 30 wt. %, and even more specifically 15 to 25 wt. %, based on the total weight of the composition.

The composition also comprises at least two flame retardant additives selected from the group consisting of from 0.01 wt. % to 0.5 wt. % of a first sulfonate salt, from 0.01 wt. % to 0.5 wt. % of a second sulfonate salt, from 0.5 wt. % to 5 wt. % of a siloxane copolymer, and combinations thereof. This is based on the unexpected finding that at least two different aromatic sulfonate salts, in amounts of 0.01 to 0.5 wt. % based on the total weight of the thermoplastic composition, can act synergistically to provide improved flame retardance to thin, reinforced polyimide/polyester-polycarbonate articles. A siloxane copolymer in combination with one or more of the sulfonate salts can also provide improved flame retardance, as will become apparent in the following examples.

One of the aromatic sulfonate salts is a monoaryl sulfonate of formula (19)

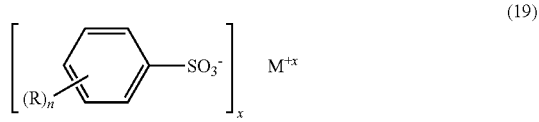

and the other aromatic sulfonate salt is a diaryl sulfonate salt of formula (20)

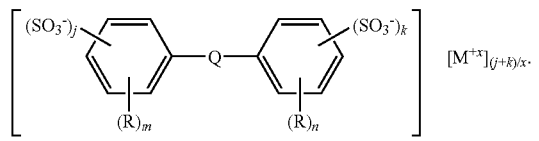

The monoaryl and diaryl sulfonate salts are interchangeably referred to as the first and the second sulfonate salts depending on whether one or both is present in the thermoplastic composition. In formulas (19) and (20), each R is independently for each substitution a $C_1$-$C_{10}$ alkyl or alkyl ether group, a $C_6$-$C_{10}$ alkylaryl, arylalkyl, or arylether group, or a halogen; Q is a divalent linking group; each M is an alkali metal or alkaline earth metal; x is 1 or 2, the oxidation state of M; and j, k, m and n are each integers from 0 to 5, subject to the limitation that j+k is at least 1 and subject to the further limitation that j+m is less than or equal to 5 and k+n is less than or equal to 5. In a specific embodiment, j is zero and k is one, and more specifically R is a $C_1$-$C_6$ alkyl group, more specifically a $C_1$-$C_4$ alkyl group, even more specifically a $C_1$-$C_2$ alkyl group. The divalent linking group Q can be an —$SO_2$— or —O— group. Specific metals are selected from the group consisting of periodic table Group IA metals, still more specifically sodium and potassium. Specific exemplary aromatic sulfonate salts include alkaline and alkaline earth metal salts of benzene sulfonate, toluene sulfonate, dichlorophenyl benzene sulfonate, diphenyl sulfone sulfonate, and the like, in particular sodium toluene sulfonate, sodium benzene sulfonate, sodium dichlorophenyl benzene sulfonate, and potassium diphenyl sulfone sulfonate.

The monoaryl sulfonate salt can be present in the composition in an amount from 0.01 to 0.5 wt. %, and more specifically 0.01 to 0.3 wt. %, each based on the total weight of the composition. The diaryl sulfonate salt can be present in the composition in an amount from 0.01 to 0.5 wt. %, more specifically 0.01 to 0.3 wt. %, each based on the total weight of the composition. In a specific embodiment the flame retardant thermoplastic composition comprises first and second sulfonate salts comprising sodium toluene sulfonate (NaTS) and potassium diphenyl sulfone sulfonate (KSS).

In some instances it is desired to have flame retardant compositions that are essentially free of bromine and chlorine. "Essentially free" of bromine and chlorine means that the composition has less than 3 wt. % of bromine and chlorine, and in other embodiments less than 1 wt. % bromine and chlorine by weight of the composition. In other embodiments, the composition is halogen free. "Halogen free" is defined as having a halogen content (total amount of fluorine, bromine, chlorine and iodine) of less than or equal to 1000 parts by weight of halogen per million parts by weight of the total composition (ppm). The amount of halogen can be determined by ordinary chemical analysis such as atomic absorption.

A variety of siloxane copolymers can optionally be used in effective amounts to improve the flame retardant performance of the composition. As used herein, a "siloxane copolymer" means a copolymer comprising polysiloxane (i.e., polydiorganosiloxane) units together with other polymer units. The siloxane units are of the formula (11)

wherein each $R^5$ is the same or different, and is a saturated, unsaturated or aromatic monocyclic and polycyclic groups having 5 to 30 carbon atoms, substituted or unsubstituted alkyl groups having 1 to 30 carbon atoms, and substituted or unsubstituted alkenyl groups having 2 to 30 carbon atoms, specifically a $C_1$-$C_{14}$ alkyl, alkoxy, aryl, or aryloxy group that can be partially or fully substituted with a halogen, specifically fluorine. In one embodiment each $R^5$ is independently a methyl, trifluoromethyl, or phenyl group, more specifically a methyl group.

A siloxane copolymer selected from the group consisting of a polyimide siloxane, polyetherimide siloxane, polyetherimide sulfone siloxane, polycarbonate siloxane, polyester-polycarbonate siloxane, polysulfone siloxane, polyether sulfone siloxane, polyphenylene ether sulfone siloxane, and a mixture thereof can be used in the thermoplastic compositions as long as the desired properties are not adversely affected; for example melt flow rate, flexural modulus, tensile strength, and flame retardance. In one embodiment the siloxane copolymer is a polyetherimide siloxane. Polyetherimide siloxane copolymers (or polycarbonate siloxane copolymers) can be particularly effective in reducing heat release and improving flame retardance performance. Mixtures of different types of siloxane copolymers are also contemplated. In one embodiment a siloxane copolymer comprises from 20 to 50 wt. % polydiorganosiloxane, based on the total weight of the siloxane copolymer.

The block length of the siloxane segment of the copolymer can be of any effective length, for example from 2 to 50 siloxane repeating units. In other instances the siloxane block length can be from 5 to 30 repeat units. In many instances dimethyl siloxanes can be used.

Polyetherimide siloxane copolymers (PEI-siloxanes) are a specific embodiment of the siloxane copolymers that can be used in the flame retardant thermoplastic compositions. Examples of such polyetherimide siloxane copolymers are shown in U.S. Pat. Nos. 4,404,350, 4,808,686, and 4,690,997. In one instance polyetherimide siloxanes can be prepared in a manner similar to that used for polyetherimides, except that a portion, or all, of the organic diamine reactant is replaced by an amine-terminated siloxane, for example of the formula (12)

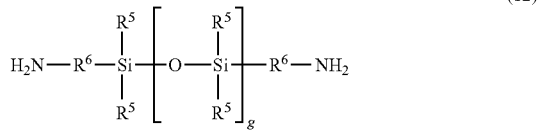

wherein each $R^5$ is as defined above, and each $R^6$ is independently at each occurrence divalent, substituted or unsubstituted, saturated, unsaturated or aromatic monocyclic and polycyclic groups having 5 to 30 carbon atoms, substituted or unsubstituted alkyl groups having 2 to 30 carbon atoms and g is an integer having an average value of 1 to 50, specifically 1 to 40, more specifically 5 to 30. In one embodiment each $R^5$ is a methyl group and each $R^6$ is the same or different alkylene groups having 3 to 10 carbon atoms. In some embodiments of the polyetherimides siloxane copolymers, the diamine component of the polyetherimide siloxane copolymer can contain from 20 to 50 mole % of the amine-terminated organosiloxane of formula (12) and from 50 to 80 mole % of the organic diamine of formula (9). In some polyetherimide siloxane copolymers, the siloxane component is derived from 25 to 40 mole % of an amine or anhydride terminated organosiloxane, for example as described in U.S. Pat. No. 4,404,350. The synthesis of diaminosiloxanes is known in the art and is taught, for example, in U.S. Pat. Nos. 4,808,686, 5,026,890, 6,339,1376, and 6,353,073.

The siloxane copolymer component of the thermoplastic composition can be present in an amount of 0.0 to 10 wt. % with respect to the total weight of the composition. Within this range, the siloxane copolymer can also be present in an amount 0.5 wt. % to 5 wt. %, further from 0.5 to 2.0 wt. %, based on the total weight of the composition.

The compositions further comprise a reinforcing filler, for example a flat, plate-like and/or fibrous filler. Typically, the flat, plate-like filler has a length and width at least ten times greater than its thickness, where the thickness is from 1 to 1000 microns. Exemplary reinforcing fillers of this type include glass flakes, flaked silicon carbide, aluminum diboride, aluminum flakes, and steel flakes; wollastonite including surface-treated wollastonite; calcium sulfate (as its anhydride, dihydrate or trihydrate); calcium carbonate including chalk, limestone, marble and synthetic, precipitated calcium carbonates, generally in the form of a ground particulates; talc, including fibrous, modular, needle shaped, and lamellar talc; kaolin, including hard, soft, calcined kaolin, and kaolin comprising various coatings known in the art to facilitate compatibility with the polymeric matrix resin; mica; and feldspar.

Exemplary reinforcing fillers also include fibrous fillers such as short inorganic fibers, natural fibrous fillers, single crystal fibers, glass fibers, and organic reinforcing fibrous fillers. Short inorganic fibers include those derived from blends comprising at least one of aluminum silicates, aluminum oxides, magnesium oxides, and calcium sulfate hemihydrate. Natural fibrous fillers include wood flour obtained by pulverizing wood, and fibrous products such as cellulose, cotton, sisal, jute, starch, cork flour, lignin, ground nut shells, corn, rice grain husks. Single crystal fibers or "whiskers" include silicon carbide, alumina, boron carbide, iron, nickel, and copper single crystal fibers. Glass fibers, including textile glass fibers such as E, A, C, ECR, R, S, D, and NE glasses and quartz, and the like can also be used. In addition, organic reinforcing fibrous fillers can also be used including organic polymers capable of forming fibers. Illustrative examples of such organic fibrous fillers include, for example, poly(ether ketone), polyimide, polybenzoxazole, poly(phenylene sulfide), polyesters, polyethylene, aromatic polyamides, aromatic polyimides or polyetherimides, polytetrafluoroethylene, acrylic resins, and poly(vinyl alcohol).

Such reinforcing fillers can be provided in the form of monofilament or multifilament fibers and can be used either alone or in combination with other types of fiber, through, for example, co-weaving or core/sheath, side-by-side, orange-type or matrix and fibril constructions, or by other methods known to one skilled in the art of fiber manufacture. Typical cowoven structures include glass fiber-carbon fiber, carbon fiber-aromatic polyimide (aramid) fiber, and aromatic polyimide fiber-glass fiber. Fibrous fillers can be supplied in the form of, for example, rovings, woven fibrous reinforcements, such as 0-90 degree fabrics, non-woven fibrous reinforcements such as continuous strand mat, chopped strand mat, tissues, papers and felts and 3-dimensionally woven reinforcements, performs and braids.

The reinforcing fibers can have a diameter of 5 to 25 micrometers, specifically diameters of 6 to 7 micrometers. In preparing molding compositions it is convenient to use reinforcing fibers such as fiberglass in the form of chopped strands of from 3 millimeters to 15 millimeters long. In articles molded from these compositions, on the other hand, shorter lengths will typically be encountered because during compounding considerable fragmentation may occur. Combinations of rigid fibrous fillers with flat, plate-like fillers can be used, for example to reduce warp of a molded article.

In some applications it may be desirable to treat the surface of the filler with a chemical coupling agent to improve adhesion to a thermoplastic resin in the composition. Examples of useful coupling agents are alkoxy silanes and alkoxy zirconates. Amino, epoxy, amide, or thio functional alkoxy silanes are especially useful. Fiber coatings with high thermal stability are preferred to prevent decomposition of the coating, which could result in foaming or gas generation during processing at the high melt temperatures required to form the compositions into molded parts.

The amount of reinforcing filler used in the flame retardant composition can vary widely, and is that amount effective to provide the desired physical properties and flame resistance. In some instances the reinforcing filler is present in an amount from more than 30 to 60 wt. %, more specifically 45 to 60 wt. %, and even more specifically 45 to 50 wt. % each based on the total weight of the composition.

The thermoplastic composition can further comprise one or more other types of particulate fillers. Exemplary particulate fillers include silica powder, such as fused silica and crystalline silica; boron-nitride powder and boron-silicate powders; alumina, and magnesium oxide (or magnesia); silicate spheres; flue dust; cenospheres; aluminosilicate (atmospheres); natural silica sand; quartz; quartzite; perlite; tripoli; diatomaceous earth; synthetic silica; and combinations thereof. All of the above fillers can be surface treated with silanes to improve adhesion and dispersion with the polymeric matrix resin. When present, the amount of additional particulate filler in the flame retardant composition can vary widely, and is that amount effective to provide the desired physical properties and flame resistance. In some instances the particulate filler is present in an amount from 1 to 80 wt. %, specifically 5 to 60 wt. %, more specifically 5 to 50 wt. %, each based on the total weight of the composition.

Other additives that can be used include antioxidants, flow aids, mold release compounds, UV absorbers, stabilizers such as light stabilizers and others, lubricants, plasticizers, colorants, including pigments and dyes, anti-static agents, foaming agents, blowing agents, metal deactivators, and combinations comprising one or more of the foregoing additives. Such additives are selected so as to not significantly adversely affect the desired properties of the composition, for example flame resistance, flexural modulus, tensile strength, and glass transition temperature.

Suitable antioxidants can be compounds such as phosphites, phosphonites and hindered phenols or mixtures thereof. Phosphorus containing stabilizers including triaryl phosphite and aryl phosphonates are of note as useful additives. Difunctional phosphorus containing compounds can also be employed. Stabilizers can have a molecular weight greater than or equal to 300. In some embodiments, phosphorus-containing stabilizers with a molecular weight greater than or equal to 500 are useful. Phosphorus containing stabilizers are typically present in the composition at 0.05 to 0.5 wt. % based on total weight of the composition.

Examples of mold release agents include both aliphatic and aromatic carboxylic acids and their alkyl esters, for example, stearic acid, behenic acid, pentaerythritol tetrastearate, glycerin tristearate, and ethylene glycol distearate. Polyolefins such as high density polyethylene, linear low density polyethylene, low density polyethylene and similar polyolefin homopolymers and copolymers can also be used a mold release agents. Mold release agents are typically present in the composition at 0.05 to 0.5 wt. % based on total weight of the composition. Preferred mold release agents will have high molecular weight, typically greater than 300, to prevent loss of the release agent from the molten polymer mixture during melt processing.

The composition can also optionally include a fluoropolymer in an effective amount to provide anti-drip or other beneficial properties to the resin composition. In one instance the fluoropolymer is present in an amount 0.01 to 5.0 wt. % of the composition. Examples of suitable fluoropolymers and methods for making such fluoropolymers are set forth, for example, in U.S. Pat. Nos. 3,671,487, 3,723,373, and 3,383,092. Suitable fluoropolymers include homopolymers and copolymers that comprise structural units derived from one or more fluorinated alpha-olefin monomers, for example, $CF_2=CF_2$, $CHF=CF_2$, $CH_2=CF_2$ and $CH_2=CHF$ and fluoro propylenes such as, for example, $CF_3CF=CF_2$, $CF_3CF=CHF$, $CF_3CH=CF_2$, $CF_3CH=CH_2$, $CF_3CF=CHF$, $CHF_2CH=CHF$ and $CF_3CF=CH_2$.

Copolymers comprising structural units derived from two or more fluorinated alpha-olefin monomers can also be used, for example poly(tetrafluoroethylene-hexafluoroethylene), as well as copolymers comprising structural units derived from one or more fluorinated monomers and one or more non-fluorinated monoethylenically unsaturated monomers that are copolymerizable with the fluorinated monomers such as poly(tetrafluoroethylene-ethylene-propylene) copolymers. Suitable non-fluorinated monoethylenically unsaturated monomers include for example, alpha-olefin monomers such as ethylene, propylene, butene, acrylate monomers such as, methyl methacrylate, butyl acrylate, and the like, with poly(tetrafluoroethylene) homopolymer (PTFE) preferred.

The fluoropolymer can be pre-blended in some manner with a polymer such as an aromatic polycarbonate or polyimide resin. For example, an aqueous dispersion of fluoropolymer and a polycarbonate resin may be steam precipitated to form a fluoropolymer concentrate for use as a drip inhibitor additive in thermoplastic resin compositions, as disclosed, for example, in U.S. Pat. No. 5,521,230. Alternatively, the fluoropolymer can be encapsulated.

The flame retardant thermoplastic compositions can be prepared by blending the aforementioned ingredients using a variety of methods involving intimate admixing of the materials with any additional additives desired in the formulation. A preferred procedure includes melt blending, although solution blending is also possible. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between 250° C. and 370° C. in the molten resin composition, although higher temperatures can be used provided that the residence time of the resin in the processing equipment is kept short. In some embodiments the melt processed composition exits processing equipment such as an extruder through small exit holes in a die, and the resulting strands of molten resin are cooled by passing the strands through a water bath. The cooled strands can be chopped into small pellets for packaging, further handling and processing.

In some embodiments the flame retardant thermoplastic composition has a melt viscosity of 50 to 20,000 Pascal-seconds, 100 to 15,000 Pascal-seconds, or more specifically, 200 to 10,000 Pascal-seconds at 380° C. as measured by ASTM method D3835 using a capillary rheometer with a shear rate of 100 to 10,000 1/sec.

In another embodiment, the composition can have heat deflection temperature (HDT) of greater than or equal to 120° C., specifically 170° C. to 400° C., measured according to ASTM D648 on a 3.2 mm bar at 0.46 MPa (66 psi).

The composition can have a tensile strength greater than or equal to 70 MPa, specifically 70 To 500 MPa, measured in accordance with ASTM D648.

The flame retardant thermoplastic composition can have a melt flow rate (MFR) at 360° C. of greater than 10 grams per 10 minutes, when measured in accordance with ASTM D1238 at 295° C. using a 6.7 Kg weight.

In an important feature, thin articles molded from the thermoplastic compositions are flame resistant. In particular, an article molded from the thermoplastic composition and having a thickness of 1.0 mm meets the UL94 standard of V2.

In one embodiment the composition comprises based on total weight of the composition from 0.01 wt. % to 0.5 wt. % of the first sulfonate salt, from 0.01 wt. % to 0.5 wt. % of the second sulfonate salt, and from 0.5 wt. % to 5 wt. % of the siloxane copolymer, wherein the composition exhibits an improved UL94 rating as compared to the same composition without the first sulfonate salt, the second sulfonate salt, and the siloxane copolymer.

An article comprising from 0.05 to 0.1 wt. % of potassium diphenyl sulfone sulfonate and from 0.1 to 0.15 wt. % of sodium toluene sulfonate based on total weight of the thermoplastic composition attains a UL94 rating of V1 at a thickness of 1.0 mm.

An article comprising from 0.15 to 0.3 wt. % of potassium diphenyl sulfone sulfonate and from 0.15 to 0.3 wt. % of sodium toluene sulfonate based on total weight of the thermoplastic composition attains a UL94 rating of V0 at a thickness of 1.0 mm.

An article comprising from 0.01 to 0.15 wt. % of potassium diphenyl sulfone sulfonate and from 0.01 to 0.15 wt. % of sodium toluene sulfonate based on total weight of the thermoplastic composition attains a UL94 rating of V2 at a thickness of 0.83 mm.

An article comprising from 0.15 to 0.25 wt. % of potassium diphenyl sulfone sulfonate and from 0.15 to 0.25 wt. % of sodium toluene sulfonate based on total weight of the thermoplastic composition attains a UL94 rating of V1 at a thickness of 0.83 mm.

An article comprising from 0.25 to 0.3 wt. % of potassium diphenyl sulfone sulfonate and from 0.1 to 0.3 wt. % of sodium toluene sulfonate based on total weight of the thermoplastic composition attains a UL94 rating of V0 at a thickness of 0.83 mm.

An article comprising from 0.05 to 0.3 wt. % of a first sulfonate salt comprising sodium toluene sulfonate and from 0.25 to 5 wt. % of the siloxane copolymer based on total weight of the thermoplastic composition attains a UL94 rating of V1 at a thickness of 0.83 mm.

An article comprising from 0.05 to 0.3 wt. % of a first sulfonate salt comprising potassium diphenyl sulfone sulfonate and from 0.25 to 5 wt. % of the siloxane copolymer based on total weight of the thermoplastic composition attains a UL94 rating of V1 at a thickness of 0.83 mm.

An article comprising from 0.5 to 5 wt. % of the siloxane copolymer, based on the total weight of the composition, does not drip under UL94 test conditions and has a UL94 rating of V0 at the thickness of 0.83 mm.

Further, a composition comprising from 0.1 to 0.3 wt. % of a first sulfonate salt comprising potassium diphenyl sulfone sulfonate and from 0.01 to 0.1 wt. % of a second sulfonate salt comprising sodium toluene sulfonate, and further comprising from 0.5 to 1 wt. % of a siloxane copolymer, based on total weight of the thermoplastic composition, does not drip under UL94 test conditions.

In a more specific embodiment of the composition, the composition comprises, based on the total weight of the composition, from 30 to 60 wt. % of the reinforcing filler; from 0.25 to 0.3 wt. % of the first sulfonate salt comprising potassium diphenyl sulfone sulfonate; and from 0.1 to 0.3 wt. % of the second sulfonate salt comprising sodium toluene sulfonate; wherein the polyimide is a polyetherimide derived from the reaction of bisphenol-A dianhydride, oxydiphthalic anhydride, or a combination thereof, with m-phenylenediamine, p-phenylenediamine, a diamino diaryl sulfone, or a combination thereof, the polyester-polycarbonate comprises poly(isophthalate-terephthalate-resorcinol ester)-co-(bisphenol-A carbonate); and wherein an article molded from the composition attains a UL94 rating of V0 at a thickness of 0.83 mm.

In another specific embodiment, the composition comprises, based on the total weight of the composition, from 30 to 60 wt. % of the reinforcing filler; from 0.01 to 0.5 wt. % of the first sulfonate salt comprising potassium diphenyl sulfone sulfonate; and from 0.01 wt. % to 0.5 wt. % of the second sulfonate salt comprising sodium toluene sulfonate; from 0.5 wt. % to 5 wt. % of the siloxane polymer comprising a polyetherimide-siloxane copolymer, wherein the polyimide is a polyetherimide derived from the reaction of bisphenol-A dianhydride, oxydiphthalic anhydride, or a combination thereof, with m-phenylenediamine, p-phenylenediamine, a diamino diaryl sulfone, or a combination thereof; the polyester-polycarbonate comprises poly(isophthalate-terephthalate-resorcinol ester)-co-(bisphenol-A carbonate); and wherein an article molded from the composition attains a UL94 rating of V0 at a thickness of 0.83 mm without dripping.

The thermoplastic compositions can be formed into articles by any number of methods, for example, shaping, extruding (including profile extrusion), thermoforming, or molding, including injection molding, compression molding, gas assist molding, structural foam molding, and blow molding. In one embodiment a method of forming an article comprises shaping, extruding, blow molding, or injection molding the composition to form the article.

Examples of such articles include, but are not limited to, cookware, food service items, medical devices, trays, plates, handles, helmets, animal cages, electrical connectors, enclosures for electrical equipment, engine parts, automotive engine parts, lighting sockets and reflectors, electric motor parts, power distribution equipment, communication equipment, computers and the like, including devices that have molded in snap fit connectors. The thermoplastic compositions can also be made into film and sheet as well as components of laminate systems. Other articles include, for example, fibers, sheets, films, multilayer sheets, multilayer films, molded parts, extruded profiles, coated parts and foams: windows, luggage racks, wall panels, chair parts, lighting panels, diffusers, shades, partitions, lenses, skylights, lighting devices, reflectors, ductwork, cable trays, conduits, pipes, cable ties, wire coatings, electrical connectors, air handling devices, ventilators, louvers, insulation, bins, storage containers, doors, hinges, handles, sinks, mirror housing, mirrors, toilet seats, hangers, coat hooks, shelving, ladders, hand rails, steps, carts, trays, cookware, food service equipment, communications equipment and instrument panels.

Thermoplastic compositions discussed herein can be converted to articles using common thermoplastic processes such as film and sheet extrusion. Film and sheet extrusion processes can include and are not limited to melt casting, blown film extrusion and calendaring. Co-extrusion and lamination processes can be employed to form composite multi-layer films or sheets. Single or multiple layers of coatings can further be applied to the single or multi-layer substrates to impart additional properties such as scratch resistance, ultraviolet light resistance, aesthetic appeal, etc. Coatings can be applied through standard application techniques such as rolling, spraying, dipping, brushing, or flow coating. Film and sheet can alternatively be prepared by casting a solution or suspension of the thermoplastic composition in a suitable solvent onto a substrate, belt, or roll followed by removal of the solvent. Films can also be metallized using standard processes such as sputtering, vacuum deposition and lamination with foil.

Oriented films can be prepared through blown film extrusion or by stretching cast or calendared films in the vicinity of the thermal deformation temperature using conventional stretching techniques. For instance, a radial stretching pantograph can be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

The compositions can be converted to a multiwall sheet comprising a first sheet having a first side and a second side, wherein the first sheet comprises a thermoplastic polymer, and wherein the first side of the first sheet is disposed upon a first side of a plurality of ribs; and a second sheet having a first side and a second side, wherein the second sheet comprises a thermoplastic polymer, wherein the first side of the second sheet is disposed upon a second side of the plurality of ribs, and wherein the first side of the plurality of ribs is opposed to the second side of the plurality of ribs.

The films and sheets described above can further be thermoplastically processed into shaped articles via forming and molding processes including but not limited to thermoforming, vacuum forming, pressure forming, injection molding and compression molding. Multi-layered shaped articles can also be formed by injection molding a thermoplastic resin onto a single or multi-layer film or sheet substrate by providing a single or multi-layer thermoplastic substrate having optionally one or more colors on the surface, for instance, using screen printing of a transfer dye; conforming the substrate to a mold configuration such as by forming and trimming a substrate into a three dimensional shape and fitting the substrate into a mold having a surface which matches the three dimensional shape of the substrate; injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including and not limited to heat-setting, texturing, embossing, corona treatment, flame treatment, plasma treatment and vacuum deposition can further be applied to the above articles to alter surface appearances and impart additional functionalities to the articles.

Accordingly, another embodiment relates to articles, sheets, and films prepared from the compositions above.

Without further elaboration, it is believed that one skilled in the art can, using the description herein, utilize the present invention. The following examples are included to provide additional guidance to those skilled in the art of practicing the claimed invention. The examples provided are merely representative of the work and contribute to the teaching of the present invention. Accordingly, these examples are not intended to limit the invention in any manner.

EXAMPLES

Materials used in the Examples are listed Table 1. Amounts listed in the Examples are in weight percent based on the total weight of the composition.

TABLE 1

| Component | | Source |
|---|---|---|
| PEI | PEI comprising structural units derived from phenylene diamine and BPADA, Mw = 38000 g/mol. | Sabic Innovative Plastics |
| PC | Polycarbonate (LEXAN ® 121, LEXAN ® 141) | Sabic Innovative Plastics |
| PCE | Polyester-polycarbonate comprising structural units of BPA carbonate block and aromatic ester block (LEXAN ® RL6829) | Sabic Innovative Plastics |
| PEI-Siloxane | Polyetherimide dimethylsiloxane copolymer comprising structural units derived from m-phenylene diamine, BPADA, and an aminopropyl terminated polydimethylsiloxane containing on average 10 silicon atoms, with a 34 wt. % siloxane content; Mn = 24,000 (measured by gel permeation chromatography) (SILTEM ® STM-1500) | Sabic Innovative Plastics |

TABLE 1-continued

| Component | | Source |
|---|---|---|
| NaTS | Sodium p-toluene sulfonate | Arichem |
| KSS | Potassium diphenyl sulfone sulfonate | Exporters & Manufacturers of Intermediates for Dyes |
| Glass Fiber | 4 mm chopped length glass fibers (165A-10P 4MM) | Owens Corning |
| Mica | MICA 150 | Suzorite, Western Japan Trading Co., Ltd |

The examples were prepared on twin extruders with normal compounding process, chopped into pellets after cooled in a water bath. Before they were injection molded into parts, the pellets were predried in an oven. The flame bars were molded with double gate inserts, and all the performance tests were according to the standard methods.

Flammability testing was conducted using the statistical "UL Tool" in which 5 bars, at the specified thickness, were burned using the UL94 test protocol and the total flame-out-time was calculated. Table 2 shows the criteria for V0, V1, and V2 under UL94 standards. TOF in the following tables refers to total of flame time in seconds.

TABLE 2

| Test Type | V0 | V1 | V2 |
|---|---|---|---|
| Each flame out time (t1 or t2) | <=10 s | <=30 s | <=30 s |
| Total after flame time for 5 specimens (t1 + t2) | <=50 s | <=250 s | <=250 s |
| After flame or afterglow time for each specimen (t2 + t3) | <=30 s | <=60 s | <=60 s |
| After flame or afterglow up to the holding clamp | No | No | No |
| Cotton Ignited | No | No | Yes |

Melt flow rate (MFR) was run on dried pellets as per ASTM D1238 at 295° C. using a 6.7 Kg weight. All molded samples were conditioned for at least 48 hours at 50% relative humidity prior to testing. Heat distortion temperature (HDT) was measured at 1.82 MPa (264 psi) on 3.2 mm thick bars as per ASTM D648.

In the following examples, 0.3 wt. % of a mold release agent (HOSTALEN GF 4760 polyethylene) and 0.2 wt. % of a heat stabilizer (Alkanox 240, tris(2,4-di-t-butylphenyl) phosphite) were each present in the formulations.

Examples 1-8 and Comparative Example A

A set of experiments was performed using different formulations of filled polyetherimide/polycarbonate blends with combinations of potassium diphenyl sulfone sulfonate (KSS), sodium p-toluene sulfonate (NaTS), and polyetherimide-siloxane copolymer. The results are shown in Table 3.

TABLE 3

|  | CEx A | Ex 1 | Ex 2 | Ex 3 | Ex 4 | Ex 5 | Ex 6 | Ex 7 | Ex 8 |
|---|---|---|---|---|---|---|---|---|---|
| PEI | 29.5 | 29.46 | 29.36 | 29.42 | 29.29 | 29.3 | 29.3 | 29.26 | 29.1 |
| PCE | 20 | 20 | 20 | 20 | 20 | 20 | 20 | 20 | 20 |
| Glass Fiber | 30 | 30 | 30 | 30 | 30 | 30 | 30 | 30 | 30 |
| Mica | 20 | 20 | 20 | 20 | 20 | 20 | 20 | 20 | 20 |
| NaTS | — | 0.01 | 0.01 | 0.03 | 0.06 | 0.1 | 0.15 | 0.06 | 0.1 |
| KSS | — | 0.03 | 0.1 | 0.05 | 0.15 | 0.1 | 0.05 | 0.18 | 0.3 |
| UL rating at 1 mm | No rating | V2 | V2 | V2 | V0 | V1 | V1 | V0 | V0 |
| UL94 rating at 0.83 mm | No rating | V2 | V2 | V2 | V2 | V2 | V2 | V2 | V0 |
| TOF of 5 bars at 1 mm | 173 | 144 | 130 | 140 | 45 | 78 | 55 | 42 | 42 |
| No. of drips in 5 bars at 1 mm | 4 | 1 | 1 | 1 | 0 | 0 | 0 | 0 | 0 |
| TOF of 5 bars at 0.83 mm | 206 | 127 | 108 | 134 | 88 | 114 | 32 | 64 | 48 |
| No. of drips in 5 bars at 0.83 mm | 3 | 1 | 1 | 1 | 1 | 1 | 1 | 1 | 0 |

As shown in Table 3, the combination of KSS/NaTS exhibits synergistic effects in amounts from 0.1 to 0.3 wt. % for KSS and 0.01 to 0.5 wt. % for NaTS. Further, the higher the KSS/NaTS loading, the better the flame resistance performance. Three formulations, Examples 4, 7, and 8 achieve a UL94 rating of V0 at 1 mm. The example using 0.3 wt. % KSS and 0.1 wt. % NaTS achieved a UL94 rating of V0 at 0.83 mm. Comparative Example A performed so poorly that it could not be rated under the procedures used.

Examples 9-12 and Comparative Example B

The effect of further refining the KSS and NaTS loadings is shown in Table 4.

TABLE 4

|  | CEx B | Ex 9 | Ex 10 | Ex 11 | Ex 12 |
|---|---|---|---|---|---|
| PEI | 29.5 | 29.3 | 29.3 | 29.1 | 29.1 |
| PCE | 20 | 20 | 20 | 20 | 20 |
| Glass fiber | 30 | 30 | 30 | 30 | 30 |
| Mica | 20 | 20 | 20 | 20 | 20 |
| NaTS | — | 0.1 | 0.15 | 0.1 | 0.3 |
| KSS | — | 0.1 | 0.05 | 0.3 | 0.1 |
| Total Amount of Sulfonate Salts (in wt. %) | 0 | 0.2 | 0.20 | 0.4 | 0.4 |
| HDT (° C.) | 189 | 187 | 186 | 184 | 183 |
| MFR (g/10 min at 360° C.) | 12.8 | 18.7 | 20.7 | 18.6 | 20.4 |
| Mn of molded bar | 18450 | 17899 | 18096 | 18462 | 16162 |
| Tg | 204.49 | 204.52 | 200.16 | 198.59 | 195.22 |
| UL94 rating at 1 mm | no rating | V2 | V1 | V0 | V0 |
| UL94 rating at 0.83 mm | no rating | V2 | V2 | V0 | V0 |

The results in Table 4 further illustrate synergistic effects with use of KSS and NaTS. Ratings of UL94 V0 at 1 mm and at 0.83 mm can be achieved at higher KSS and NaTS loading level (Examples 11 and 12). However, the higher NaTS/KSS loading in the blends increased degradation of the base resin, resulting in a decrease in HDT and Tg, and an increase in MFR. The NaTS was much more detrimental to the resin than the KSS (compare Examples 9 and 12). Comparative Example B performed so poorly that it could not be UL94 rated under the procedures used.

Examples 13-19

Examples 13-19 illustrate further refinement of the amounts of the flame retardants in order to achieve improved physical properties of the compositions.

TABLE 5

|  | Ex 13 | Ex 14 | Ex 15 | Ex 16 | Ex 17 | Ex 18 | Ex 19 |
|---|---|---|---|---|---|---|---|
| PEI | 29.1 | 29.1 | 29.1 | 29.1 | 28.1 | 28.1 | 28.1 |
| PCE | 20 | 20 | 20 | 20 | 20 | 20 | 20 |
| Glass fiber | 30 | 30 | 30 | 30 | 30 | 30 | 30 |
| Mica | 20 | 20 | 20 | 20 | 20 | 20 | 20 |
| NaTS | 0.1 | 0.1 | 0.1 | 0.1 | 0.1 | 0.1 | 0.1 |
| KSS | 0.3 | 0.3 | 0.3 | 0.3 | 0.3 | 0.3 | 0.3 |
| PEI-siloxane |  |  |  |  | 1 | 1 | 1 |
| UL94 at 1 mm | V0 | V2 | V0 | V2 | V0 | V0 | V0 |
| UL94 at 0.83 mm | V0 | V2 | V2 | V2 | V0 | V0 | V0 |
| TOF of 5 bars at 1 mm | 41 | 42 | 45 | 48 | 15 | 12 | 16 |
| Molding Condition | 1 | 2 | 3 | 4 | 1 | 2 | 3 |
| Number of drips in 5 bars at 1 mm | 0 | 1 | 0 | 1 | 0 | 0 | 0 |
| TOF of 5 bars at 0.83 mm | 48 | 72 | 53 | 56 | 22 | 18 | 23 |
| Number of drips in 5 bars at 0.83 mm | 0 | 1 | 1 | 1 | 0 | 0 | 0 |

Example 13 exhibited a V0 rating at 1 mm and a V0 rating at 0.83 mm. Example 14 exhibited a V2 rating at 1 mm and a V2 rating at 0.83 mm. Example 14 exhibited a V0 rating at 1 mm and a V2 rating at 0.83 mm. Example 16 exhibited a V2 rating at 1 mm and a V2 rating at 0.83 mm. Although the compositions were identical, the UL ratings differed because the different molding conditions, such as different molds, pressures, injection speed, and the like (Table 6).

0.83 mm and 1 mm was achieved by significantly reducing the TOF without any drips.

Examples 20-31

A further set of experiments was performed with different ratio of NaTS, KSS, and PEI-siloxane. Results are shown in Table 7.

TABLE 7

|  | CEx C | Ex 20 | Ex 21 | Ex 22 | Ex 23 | CEx D | Ex 24 | Ex 25 | Ex 26 |
|---|---|---|---|---|---|---|---|---|---|
| PEI | 29.5 | 29.25 | 28.85 | 28.9 | 28.65 | 28.5 | 28.2 | 28.3 | 28.1 |
| PCE | 20 | 20 | 20 | 20 | 20 | 20 | 20 | 20 | 20 |
| Glass fiber | 30 | 30 | 30 | 30 | 30 | 30 | 30 | 30 | 30 |
| Mica | 20 | 20 | 20 | 20 | 20 | 20 | 20 | 20 | 20 |
| NaTS | — | 0.1 | — | 0.1 | 0.05 | — | — | 0.05 | 0.01 |
| KSS | — | 0.15 | 0.15 | — | 0.3 | — | 0.3 | 0.15 | 0.3 |
| PEI-siloxane | — | — | 0.5 | 0.5 | 0.5 | 1 | 1 | 1 | 1 |
| HDT (° C.) | 183 | 181 | 181 | 179 | 180 | 180 | 181 | 180 | 178 |
| MFR (g/10 min at 360° C.) | 16 | 24.5 | 17.1 | 20 | 21.8 | 20.3 | 19.9 | 21.2 | 25.5 |
| Mn of molded bar | 44418 | 43563 | 43985 | 43038 | 43419 | 44081 | 44124 | 43427 | 42643 |
| UL94 rating at 0.83 mm | no rating | V1 | V1 | V1 | V0 | V1 | V1 | V0 | V0 |

TABLE 6

|  | Molding Conditions | | | |
|---|---|---|---|---|
|  | 1 | 2 | 3 | 4 |
| Melt temp(° C.) | 345-355 | 355-365 | 345-355 | 355-365 |
| Injection speed (mm/s) | 500-800 | 500-800 | 200-500 | 200-500 |
| Injection pressure (Kgf/cm³) | 2500-3000 | 2500-3000 | 2500-3000 | 2500-3000 |

In Table 5, Examples 17, 18, and 19 had the same composition as Examples 13 to 16, except that the composition also included 1 wt. % of PEI-siloxane, SILTEM®. The addition of the PEI-siloxane produced compositions that exhibited a UL 94 rating of V0 at 1 mm and V0 at 0.83 mm. The process conditions of Example 17 were the same process conditions used in Example 13. The process conditions of Example 18 were the same process conditions used in Example 14. The process conditions of Example 19 were the same process conditions used in Example 15. The results show that although a marginal V0 rating can be obtained with the combination of 0.1 wt. % NaTS and 0.3 wt. % KSS without siloxane polymer, the addition of 1% SILTEM® results in a more robust V0 rating; that is, the UL94 rating is less sensitive to process conditions.

To summarize Table 5, the results show that to balance the flame resistance performance and other properties such as the HDT, Mn, and Tg of the blends, the NaTS should be present at lower levels than KSS. The flame resistance performance of the formula with 0.1 wt. % NaTS and 0.3 wt. % KSS, repeated in Examples 13-16, showed a marginal pass at V0 at both 0.83 mm and 1 mm thickness. Some flame drips were found in the tests. By comparison, Examples 17-19 showed robust flame resistance performance with 0.1 wt. % NaTS and 0.3 wt. % KSS in combination with 1 wt. % PEI-siloxane copolymer. When PEI-siloxane copolymer was incorporated into the compositions, flame resistance performance improved significantly and a robust UL94 rating of V0 at both As can be seen from Table 7, Examples 23, 25, and 26 achieved a UL 94 rating of V0 at 0.83 mm with very low level loading of NaTS and KSS. The data shows that relatively superior performance was obtained when (i) mixtures of salts, NaTS and KSS, were used or (ii) mixtures of salts, NaTS and KSS, were used in conjunction with PEI-siloxane, as compared to compositions that contained only one salt or no salt.

Example 26, for instance, which contained NaTS, KSS, and PEI-siloxane exhibited a V0 rating, as compared to the composition of Example 24, which contained only the KSS salt and PEI-siloxane, which exhibited a V1 rating. The performance difference between V0 and V1 is significant.

Example 25, which contained NaTS, KSS, and PEI-siloxane exhibited a V0 rating, as compared to Comparative Example D, which contained only the PEI-siloxane, which exhibited a rating of V1.

Example 26, which contained NaTS, KSS and PEI-siloxane, exhibited a V0 rating, as compared to Comparative Example D, which contained only the PEI-siloxane, which exhibited a rating of V1.

All patents and references cited herein are incorporated by reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A composition comprising, based on the total weight of the composition,
    from 20 to 60 wt. % of a polyimide having a glass transition temperature above 180° C.;
    from 10 to 30 wt. % a polyester-polycarbonate, wherein the content of ester units is from greater than 0 to 60 wt. % of the polyester-polycarbonate;
    from 30 to 60 wt. % of a reinforcing filler;
    from 0.01 to 0.15 wt. % of potassium diphenyl sulfone sulfonate;

from 0.01 to 0.5 wt. % of sodium toluene sulfonate; and from 0.5 to 1 wt. % of a siloxane copolymer comprising a polyetherimide-siloxane copolymer;

wherein the polyimide is a polyetherimide derived from the reaction of bisphenol-A dianhydride, oxydiphthalic anhydride, or a combination thereof, with m-phenylenediamine, p-phenylenediamine, a diamino diaryl sulfone, or a combination thereof;

the polyester-polycarbonate comprises poly(isophthalate-terephthalate-resorcinol ester)-co-(bisphenol-A carbonate);

the ratio of potassium diphenyl sulfone sulfonate to sodium toluene sulfonate is 2.5:1 to 6:1; and an article molded from the composition attains a UL94 rating of V0 at a thickness of 0.83 mm without dripping.

2. The composition of claim 1, comprising less than 3 wt. % of bromine and chlorine, based on the total weight of the composition.

3. The composition of claim 1, having a halogen content of less than or equal to 1000 parts by weight of halogen per million parts by weight of the total composition.

4. The composition of claim 1, comprising less than 1 wt. % bromine and chlorine based on the total weight of the composition.

5. The composition of claim 1, comprising, based on total weight of the composition, from 0.1 to 0.15 wt. % of potassium diphenyl sulfone sulfonate and from 0.05 to 0.1 wt. % of the sodium toluene sulfonate.

6. The composition of claim 1, comprising, based on the total weight of the composition, from 0.15 to 0.25 wt. % of the sodium toluene sulfonate.

7. The composition of claim 1, comprising, based on the total weight of the composition, from 0.1 to 0.3 wt. % of sodium toluene sulfonate.

8. The composition of claim 1, wherein an article molded from the composition has a heat distortion temperature of greater than or equal to 170° C., measured in accordance with ASTM method D648 at 0.46 MPa on a 3.2 mm sample.

9. The composition of claim 1, wherein the siloxane copolymer comprises from 20 to 50 wt. % of diorganosiloxane units, based on the weight of the siloxane copolymer.

10. The composition of claim 1, wherein the polyester-polycarbonate comprises, based on the total weight of the polyester-polycarbonate, from greater than 0 to 60 weight percent of the isophthalate-terephthalate-resorcinol units.

11. A method of manufacture of the composition of claim 1, comprising melt blending the components of the composition of claim 1.

12. An article comprising the composition of any of claims 1-4.

13. The article of claim 12, selected from the group consisting of a sheet, film, multilayer sheet, multilayer film, molded part, extruded profile, coated part, and fiber.

14. A method of forming an article, comprising shaping, extruding, blow molding, or injection molding the composition of claim 1 to form the article.

* * * * *